Dec. 9, 1941.   J. P. MINTON   2,265,538
GAIN CONTROL FOR SEISMOGRAPH AMPLIFIERS
Filed July 9, 1938   2 Sheets-Sheet 2
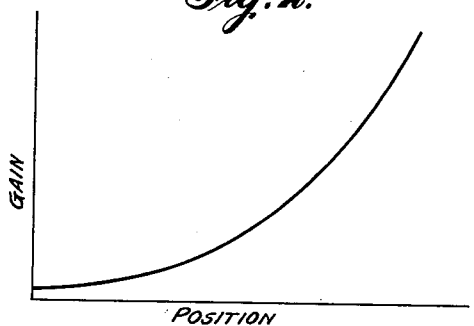
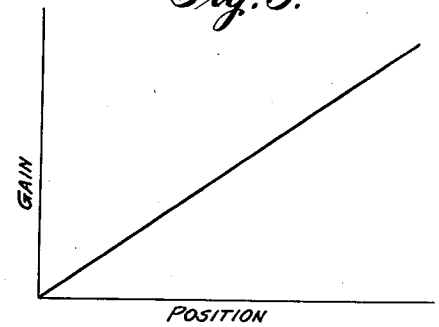
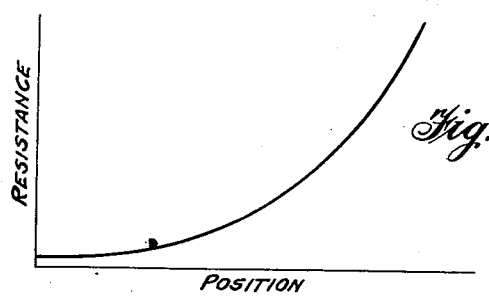
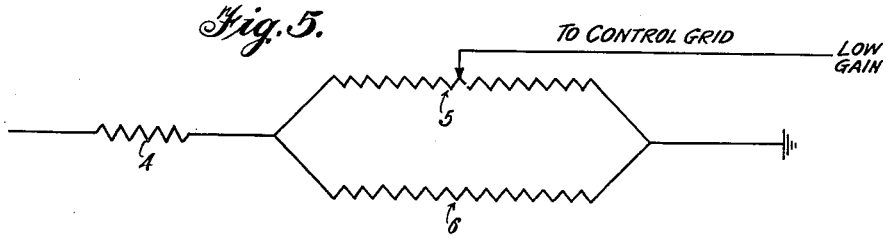
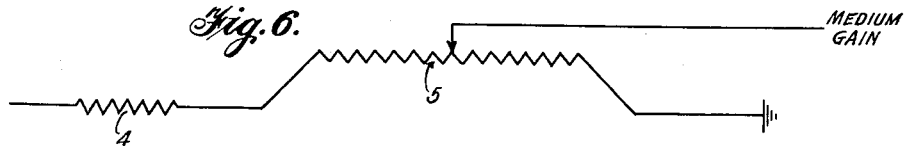
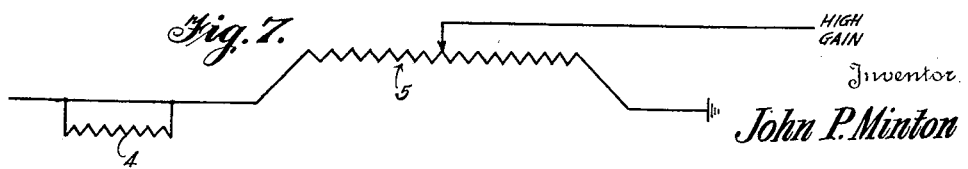
Inventor.
John P. Minton
By
Dallas R. Lamont Attorney Patented Dec. 9, 1941

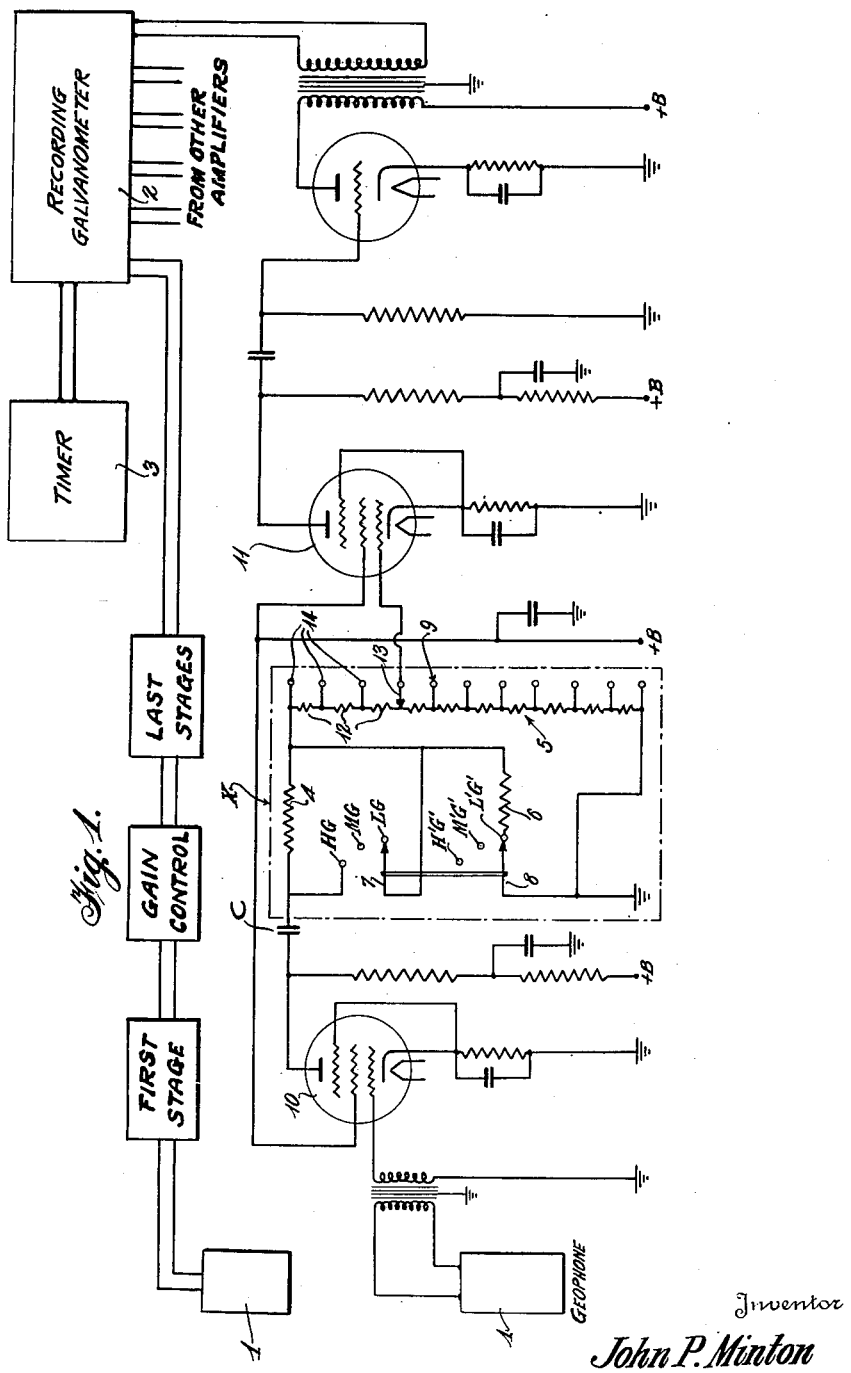

2,265,538

UNITED STATES PATENT OFFICE 2,265,538

GAIN CONTROL FOR SEISMOGRAPH AMPLIFIERS

John P. Minton, Dallas, Tex., assignor, by mesne assignments, to Socony-Vacuum Oil Company, Incorporated, New York, N. Y., a corporation of New York Application July 9, 1938, Serial No. 218,469

3 Claims. (Cl. 177—352)

This invention relates generally to electric seismographs and particularly to a gain control or trimmer for a seismograph amplifier.

Seismographic equipment utilized in conducting geophysical surveys of the earth's surface have incorporated in them a plurality of vacuum tube amplifiers for amplifying signals which have been generated in sympathy with seismic waves. The amplified signals are normally recorded by means of a galvanometer on a photographic film or sensitized paper in the form of a plurality of traces, the number of traces corresponding to the number of amplifiers used.

To aid in making an interpretation of the data recorded on the seismogram thus produced, the interpreter compares the wave form of the adjacent traces. Such a comparison could not be made accurately if the amplitude of the recorded wave in one trace is not substantially the same as the amplitude in the other traces.

Additionally, dip calculations are made from data taken from corresponding portions of recorded waves on adjacent traces, and unless the waves recorded on the respective traces are of substantially equal amplitude, it sometimes becomes extremely difficult to select common points on corresponding portions of the recorded waves. Therefore, it becomes of paramount importance that the instrument operator, in recording the seismogram, adjust the gain in the respective amplifiers in such a manner that the seismogram when recorded will have traces of substantially equal amplitude.

Designers of electric seismograph equipment have heretofore resorted to many expedients in an effort to build an amplifier, in which the gain in amplification could be controlled with certainty. For example, a very common method of controlling the gain in amplification derived from one of these amplifiers has been to place a potentiometer in the plate circuit of one of the vacuum tubes, but this method has not proven entirely satisfactory, for movement of the controls through uniform steps by the operator has produced a gain in amplification which would not be linear but follow some exponential function.

Therefore, it is a primary object of this invention to provide a method and means whereby the gain in amplification derived from a vacuum tube amplifier can be controlled linearly.

Another object of this invention is in the provision of a gain control which can be operated through uniform steps to produce a uniform increase or decrease in the gain in amplification.

This invention further contemplates means in an electric seismograph whereby the gain in amplification is directly proportional to the uniform steps of control.

Still another object of this invention is in the provision of means whereby the gain in amplification can be controlled linearly throughout the operating range of the vacuum tube amplifier.

Other objects and advantages of this invention will become apparent from the following detailed description when taken with the accompanying drawings in which:

Fig. 1 is a conventional circuit diagram of an electric seismograph showing the volume control or trimmer which forms the subject matter of this invention in detail;

Fig. 2 is a curve which has been plotted with uniform steps of resistance as abscissae and gain in amplification as ordinates;

Fig. 3 is a curve which has been plotted with position of the volume control as abscissae and gain in amplification as ordinates, showing how the gain in amplification is made to increase as a linear function when utilizing the method and apparatus forming the subject matter of this application;

Fig. 4 is a curve which has been plotted with position of the control as abscissae and resistance as ordinates, showing the manner in which the resistance changes with change in position of the control;

Fig. 5 is an equivalent circuit to that of the volume control shown in Fig. 1 that shows the manner in which the respective resistance elements are connected when the three-position switch is on the low gain position;

Fig. 6 is an equivalent circuit of the volume control shown in Fig. 1 showing the relationship between the resistance elements when the three-position switch is on the medium gain or middle contacts; and Fig. 7 is an equivalent circuit of the volume control showing the relationship between the resistance elements when the three-position switch is on the high gain control contacts.

Referring to the drawings in detail, particularly Fig. 1, there is shown diagrammatically all of the elements of a conventional electric seismograph that are used in recording one trace of a seismogram, namely a geophone 1 that is connected to the input of a conventional amplifier, a recording galvanometer 2 connected to the output of the amplifier; and timing means 3 associated with said galvanometer for producing time indications on a seismogram when recorded.

In the amplifier circuit at X there is shown in detail a volume control or trimmer. This volume control consists of the resistance elements 4, 5, and 6, the two triple contact switches 7 and 8, and the multiple contact switch 9. This control is interposed in the amplifier circuit between the plate of the vacuum tube 10 and the control grid of the vacuum tube 11 and is adapted to control the signal input to the vacuum tube 11. Since the operation of the conventional amplifier circuit without the volume control X is well known to those skilled in the art, a detailed description of it will be omitted.

The resistance element 5 is made up of a plurality of separate resistance units 12 that have been carefully selected so that when their values are plotted against the position of the contactor 13, the resultant curve will be as shown in Fig. 4. This curve will be logarithmic for resistance values selected in this manner. The resultant gain produced by the amplifier when plotted against position of the contactor 13 will be as shown in Fig. 3. From this curve it can be seen that the gain in amplification will increase uniformly with the movement of the contactor 13. The gain controls of the prior art have a characteristic such as that disclosed in Fig. 2. From this curve it can be seen that if the resistances 12 are equal, with uniform movement of the contactor, the gain in amplification would not increase linearly but would increase logarithmically.

The construction of applicant's volume control is such that three ranges of control are provided, one for low gain in amplification, another for medium gain in amplification, and still another for high gain in amplification. Adjustment from one range to another is made possible by the two triple contact switches 7 and 8 which are adapted to be operated simultaneously with a single control. With the contact arms of switches 7 and 8 on the contacts LG and L'G' as shown in Fig. 1, the low range of control becomes effective in controlling the gain of the amplifier. With the contactors of switches 7 and 8 in this position, the relationship of the resistance elements 4, 5, and 6 are as shown in Fig. 5. In this position, as well as the other two, the values of the resistances 4 and 6 are fixed and cannot be varied. In addition to controlling the gain in amplification through these three steps, it is possible to further adjust it by moving the contactor 13 to any one of the points 14 on the resistance element 5. Movement of the contactor 13 over successive points in either direction will effect a corresponding uniform increase or decrease in the gain in amplification.

If it is impossible to obtain the desired gain in amplification by movement of the contactor 13 to its last position, then it is necessary to change the position of contact arms of switches 7 and 8 to the middle or medium gain control range. In this position the contactors of switches 7 and 8 will be resting on the dead points MG and M'G', thereby eliminating the resistance element 6 from the circuit and placing resistance elements 4 and 5 in series as shown by the equivalent circuit in Fig. 6. As discussed in connection with the low gain position of switches 7 and 8, the gain in amplification can be further controlled through small steps by movement of the contactor 13 along the points 14 on the resistance element 5. A still higher range of gain in amplification can be obtained by moving the contactors of switches 7 and 8 to the high gain positions. In this position the contactors are resting on points HG and H'G'. The resistance element 6 is still out of the circuit and the resistance element 4 has been shunted. The resultant equivalent circuit then is as shown in Fig. 7. With this arrangement a still further variation of the gain in amplification can be obtained by moving the contactor 13 along the points 14 on the resistance element 5.

With a circuit arrangement as described above and illustrated in Figs. 1, 5, 6, and 7, it is possible to control the gain in amplification throughout any one of the three ranges, low, medium, or high, of any of the amplifiers used in the electric seismograph without producing a change in the phase or attenuation characteristics. This feature is of great importance when consideration is given to the fact that the seismograph is used to record relative data on the respective traces within one-thousandth of a second accuracy.

The constancy of the phase characteristic for all positions of the gain controls is thus a matter of substantial importance for seismograph exploration. Thus phase constancy is attained by suitable design such that the gain controls as a whole will all have a constant resistance of an appropriate value. This constant resistance and its associated coupling condenser, C in Figure 1, will produce a constant phase characteristic, at any particular frequency, for all the various settings of the gain control. Likewise, the same factors will produce a gain control whose impedance is constant under these same conditions.

Inasmuch as a seismograph exploration unit employs a number of channels, all gain controls, X, and coupling condensers, C, shown in Figure 1, must be identical in electrical characteristics in order that the phase characteristics of all the gain controls shall be the same, regardless of the individual gain control settings.

Although eleven contact points are shown on the resistance element 5 in Figure 1, it is obvious that any number of contact points can be used without departing from the spirit of the invention just as long as the elements 12 are chosen such that when plotted the points will fall on the logarithmic curve shown in Figure 4. Thus, in Figure 1, there are shown ten resistance units in the resistor 5 and three positions for the switch SS', making thirty steps total, each step producing the same gain increase. The number of steps, of course, can be chosen to suit the exigencies of the exploration problems.

The gain control is thus one of constant phase, constant impedance, and linear gain characteristics for all positions of its controls.

Additionally, although for purpose of explanation the invention is shown applied to only one amplifier of the seismograph, it is obvious that a similar control would be used in each amplifier of the electric seismograph.

I claim:

1. In an electric seismograph having means for detecting seismic waves at a plurality of stations which have been created in the earth's surface by a detonation of a charge of explosives, by generating electrical signals corresponding to the seismic waves, independent thermionic amplifying means for amplifying the electrical signals that have been generated by each detector, and means for recording the amplified signals on separate traces in coordination with time in the form of a seismogram, the improvement which comprises linear gain control means in each of the amplifying means, by means of which the amplification of the signals passing through each amplifier can be controlled, said linear gain controls each comprising a series of resistances whose values increase logarithmically and which may be selectively placed in the control grid circuit of at least one of the thermionic amplifying means in each amplifier, means for linearly adjusting the gain controls of each amplifier according to the variations in amplitude of traces representing the recorded signals, whereby after inspection of a single recorded record the gain controls can with a single adjustment be set to produce a record having traces on which corresponding signals will have substantially equal amplitude.

2. In an electric seismograph having means for detecting seismic waves at a plurality of stations which have been created in the earth's surface by a detonation of a charge of explosives, by generating electrical signals corresponding to the seismic waves, independent thermionic amplifying means for amplifying the electrical signals that have been generated by each detector, and means for recording the amplified signals on separate traces in coordination with time in the form of a seismogram, the improvement which comprises linear gain control means in each of the amplifying means, by means of which the amplification of the signals passing through each amplifier can be controlled, said linear gain controls each comprising a plurality of resistances that can be selectively connected in the circuit in different combinations, one of said resistances comprising a series of smaller resistances whose values increase logarithmically and the combination may be selectively placed in the control grid circuit of at least one of the thermionic amplifying means in each amplifier, means for linearly adjusting the gain controls of each amplifier according to the variations in amplitude of traces representing the recorded signals, whereby after inspection of a single recorded record the gain controls can with a single adjustment be set to produce a record having traces on which corresponding signals will have substantially equal amplitude.

3. In an electric seismograph having means for detecting seismic waves at a plurality of stations which have been created in the earth's surface by a detonation of a charge of explosives, by generating electrical signals corresponding to the seismic waves, independent thermionic amplifying means for amplifying the electrical signals that have been generated by each detector, and means for recording the amplified signals on separate traces in coordination with time in the form of a seismogram, the improvement which comprises linear gain control means in at least two of the amplifying means, by means of which the amplification of the signals passing through each amplifier can be controlled, said linear gain controls each comprising a series of resistances whose values increase logarithmically and which may be selectively placed in the control grid circuit of at least one of the thermionic amplifying means in those amplifiers, means for linearly adjusting the gain controls of those amplifiers according to the variations in amplitude of traces representing the recorded signals, whereby after inspection of a single recorded record the gain controls can with a single adjustment be set to produce a record having traces on which corresponding signals will have substantially equal amplitude.

JOHN P. MINTON.